US006604184B2

United States Patent
Zahir et al.

(10) Patent No.: US 6,604,184 B2
(45) Date of Patent: *Aug. 5, 2003

(54) VIRTUAL MEMORY MAPPING USING REGION-BASED PAGE TABLES

(75) Inventors: Achmed R. Zahir, Menlo Park, CA (US); Gary N. Hammond, Fort Collins, CO (US); John H. Crawford, Saratoga, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/344,267

(22) Filed: Jun. 30, 1999

(65) Prior Publication Data

US 2003/0018876 A1 Jan. 23, 2003

(51) Int. Cl.[7] .......................... G06F 12/00; G06F 12/10
(52) U.S. Cl. ....................... 711/207; 711/209; 711/219; 711/220
(58) Field of Search .................. 711/114, 202, 711/205, 206, 207, 208, 209, 218, 219, 220

(56) References Cited

U.S. PATENT DOCUMENTS

| 5,491,806 | A | | 2/1996 | Horstmann et al. |
| 5,652,854 | A | | 7/1997 | Wong |
| 5,809,563 | A | | 9/1998 | Yamada et al. ............. 711/207 |
| 6,012,132 | A | | 1/2000 | Yamada et al. |
| 6,308,247 | B1 | * | 10/2001 | Ackerman et al. .......... 711/202 |

FOREIGN PATENT DOCUMENTS

WO     WP 98/44419     10/1998

* cited by examiner

Primary Examiner—Matthew Kim
Assistant Examiner—Matthew D. Anderson
(74) Attorney, Agent, or Firm—Blakely, Sokoloff, Taylor & Zafman LLP (57) ABSTRACT

The present invention is a method and apparatus to map virtual memory space. A region register file provides a region identifier for a virtual address in the virtual memory space. The virtual address includes a virtual region number and a virtual page number. A virtual page table look-up circuit is coupled to the region register file to generate a page table entry (PTE) virtual address from virtual address parameters. The virtual address parameters include the virtual address.

40 Claims, 5 Drawing Sheets

VIRTUAL MEMORY MAPPING USING REGION-BASED PAGE TABLES

BACKGROUND

1. Field of the Invention

This invention relates to microprocessors. In particular, the invention relates to virtual memory.

2. Description of Related Art

Memory management subsystem is one of the most important parts of the operating system (OS). Virtual memory is a technique within the memory management subsystem to allow the processor to access a larger memory space than the physical memory that actually exists in the processor system. To accomplish this, the memory management subsystem has to provide a translation or address mapping mechanism to map the virtual address space into the physical address space.

A typical OS manages and controls a number of processes concurrently. Each process has its own virtual address space. These virtual address spaces are usually separate from each other to prevent overlapping program or data. The OS has to maintain a page table to store the mapping information for each process. When the number of processes in the system becomes large, or the number of address mappings is high, the overhead of managing virtual address mappings can become a significant performance limiter in large computer systems, especially when managing sparse 64-bit or larger address spaces.

A number of prior art techniques exist for virtual mapping. One technique uses a linear or hashed page table which is laid out in the memory contiguously. This technique requires a large physical memory space. Another technique provides global sharing of page tables for a set of translations (global bit). While this technique allows the OS to map globally shared objects efficiently, it does not provide mechanisms for mapping sparse large 64-bit or larger user address spaces efficiently.

Therefore there is a need in the technology to provide a simple and efficient method to perform virtual memory mapping.

SUMMARY

The present invention relates to a method and apparatus to map virtual memory space. In brief, one embodiment of the apparatus comprises a region register file and a virtual page table look-up circuit. The region register file provides a region identifier for a virtual address in the virtual memory space. The virtual address includes a virtual region number and a virtual page number. The virtual page table look-up circuit is coupled to the region register file to generate a page table entry (PTE) virtual address from virtual address parameters. The virtual address parameters include the the virtual address.

BRIEF DESCRIPTION OF THE DRAWINGS

The features and advantages of the present invention will become apparent from the following detailed description of the present invention in which.

DESCRIPTION

The present invention is a method and apparatus for mapping a virtual memory address to a page table entry address. The technique provides a virtual region number (VRN) field to look up a region identifier (ID). The region ID is combined with the virtual page number (VPN) to index a translation lookaside buffer (TLB). When there is a TLB miss, a page table entry (PTE) virtual address is generated using the region-based virtual parameters including the VRN, the region page size, the page table address offset register, the VPN, and the PTE size. The technique provides fewer TLB misses than the traditional techniques and simple memory management for the OS.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
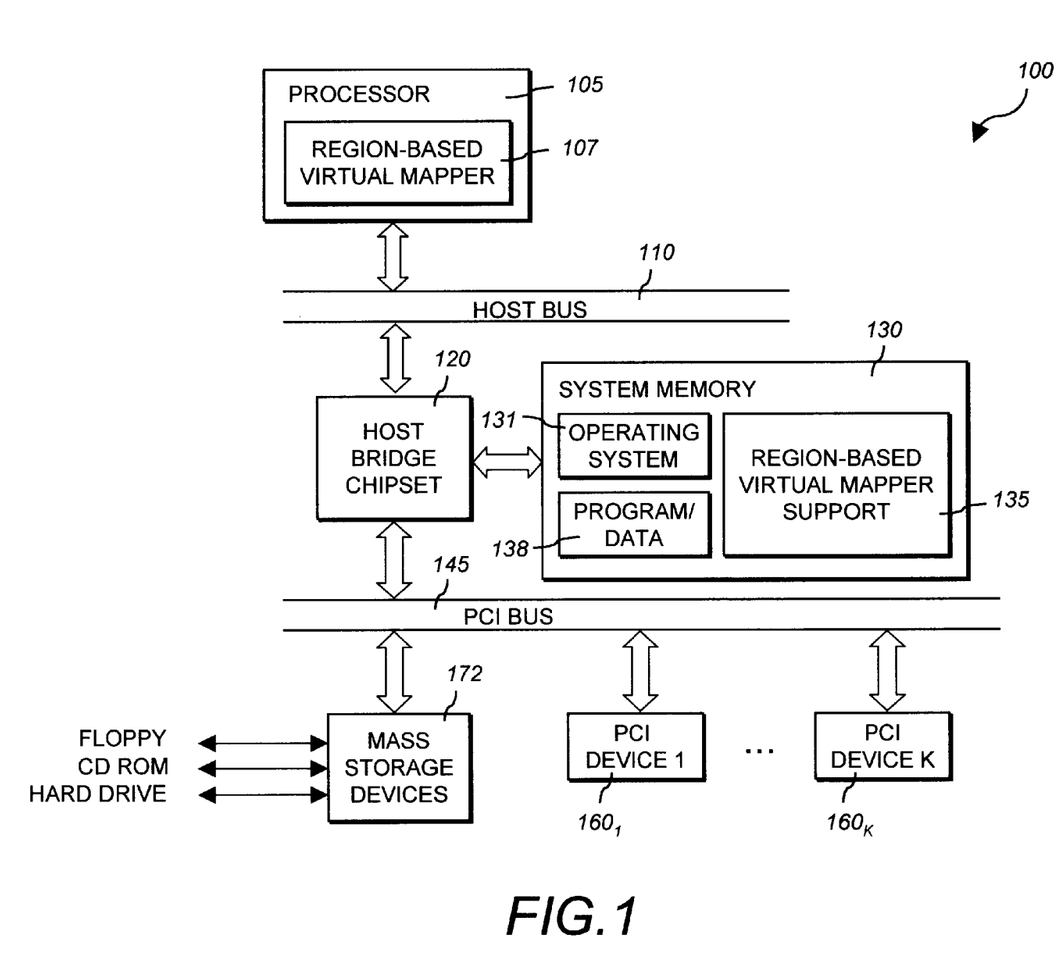
FIG. 1 is a diagram illustrating a system in which one embodiment of the invention can be practiced.

FIG. 1 is a diagram illustrating a computer system 100 in which one embodiment of the invention can be practiced. The computer system 100 include a processor 105, a host bus 110, a host bridge chipset 120, a system memory 130, a PCI bus 155, K PCI devices $160_1$ to $160_K$, and a mass storage device 172.

The processor 105 represents a central processing unit of any type of architecture, such as complex instruction set computers (CISC), reduced instruction set computers (RISC), very long instruction word (VLIW) explicitly parallel instruction set computing (EPIC), or hybrid architecture. The invention could be implemented in a multi-processor or single processor computer system.

The host bridge chipset 120 includes a number of interface circuits to allow the host processor 105 access to the system memory 130 and the PCI bus 155. The system memory 130 represents one or more mechanisms for storing information. For example, the system memory 130 may include non-volatile or volatile memories. Examples of these memories include flash memory, read only memory (ROM), or random access memory (RAM). The system memory 130 may be loaded with an operating system (OS) 131, a region-based virtual mapper support 135, and other programs and data 138. Of course, the system memory 130 preferably contains additional software (not shown), which is not necessary to understanding the invention. The virtual mapper support 135 includes elements to support the operation of the region-based virtual mapper 107 such as program, code, data, or look-up tables.

The PCI slots $160_1$ to $160_K$ provide interfaces to PCI devices. Examples of PCI devices include a network interface and a media interface. The network interface connects to communication channel such as the Internet. The Internet provides access to on-line service providers, Web browsers, and other network channels. The media interface provides access to audio and video devices. The mass storage device 172 include CD ROM, floppy diskettes, and hard drives.

The invention presented here allows operating systems to manage virtual address spaces more efficiently than traditional virtual memory mapping mechanisms. In particular, this invention enables processor hardware to significantly reduces the overhead when copying data between address spaces, e.g., between two user-level processes or between the operating system and a user-level process. Such performance optimizations are very much of interest since they can significantly reduce the amount of time required to send or receive network data from a user process. Furthermore file system buffer caching operations in an operating system can be supported at increased performance levels. These performance optimizations benefit application software in general, however, large database or Internet or Intranet Web servers will experience the largest performance benefits.

When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 2:
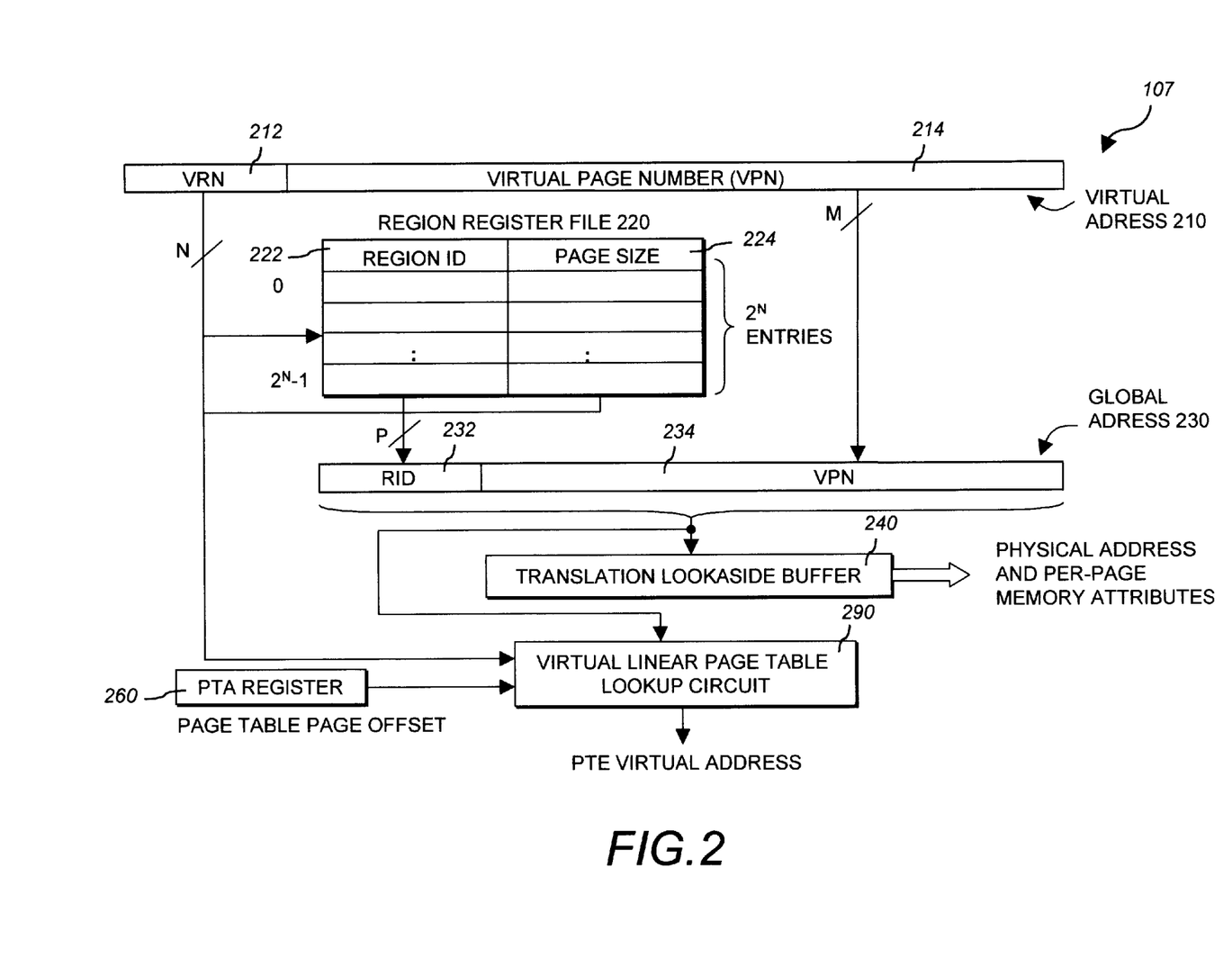
FIG. 2 is a diagram illustrating a region-based virtual mapper according to one embodiment of the invention.

FIG. 2 is a diagram illustrating a region-based virtual mapper 107 according to one embodiment of the invention. The region-based virtual mapper 107 includes a region register file 220, a translation lookaside buffer 240, a virtual page table lookup circuit 250, and a page table address (PTA) register 260.

The region-based virtual mapper 107 maps a virtual address 210 into a page table entry (PTE) corresponding to a physical address in a physical memory space accessible by the processor 105 in FIG. 1. The virtual address 210 includes two fields: a virtual region number (VRN) field 212 containing a VRN having N bits and a virtual page number (VPN) field 214 containing a VPN having M bits. The VRN is used to look up the region register file 220

The region register file (RRF) 220 stores $2^N$ entries. Each entry corresponds to a value of the VRN. Each entry has a region identifier (ID) field 222 containing the region ID having P bits and a region page size (PS) field 224 containing the region PS. The region ID is concatenated with the VPN to form a global address 230. The global address 230 includes the region ID field 232 and a VPN field 234 which contains the region ID and the VPN, respectively. The global address 230 is used to look up the PTE in the TLB 240 and is used by the virtual page table look-up circuit 250 to generate the PTE virtual address.

The TLB 240 caches page table entries of recently used global to physical address translations. When a global address lookup hits in the TLB, the TLB directly generates physical address and per-page memory attributes of the referred to page. When a global address lookup misses in the TLB, then the virtual page table lookup circuit 250 (the hardware page table walker) generates the PTE virtual address.

To translate the PTE virtual address into a physical address, the hardware page walker uses the same address translation mechanism recursively (e.g., the PTE virtual address is treated like any other virtual address). To avoid infinite recursion, a software TLB miss handler is invoked, if a PTE reference results in a TLB miss.

The virtual page table lookup circuit 250 receives a number of virtual address parameters to generate the PTE virtual address. The virtual address parameters include the global address 230, the region page size, the VRN 212, the VPN 214, the PTA offset (PTA.base) from the PTA register 260, and the PTE size. In one embodiment, the PTE virtual address is generated as follows:

$$\text{Index} = VPN\{M-1:0\} >> RRF[VRN].ps \quad (1a)$$

$$PTE \text{ virtual address} = (VRN\{N-1:0\} << M) \text{ OR } ((PTA.base\{M-1:0\}) \text{ OR } (\text{Index} << PTE \text{ size})) \quad (1b)$$

where "RRF[VRN].ps" is the region page size in the RRF 220 corresponding to the underlying VRN. The operators >> and << refer to shift right and shift left, respectively.

When implemented in hardware the virtual page table look-up circuit includes circuit elements to perform the above operations (1a) and (1b). The virtual page table look-up circuit includes an index generator, first and second left shifters, and a logic circuit. The index generator generates an index by shifting right the virtual page number by a number of places corresponding to the region page size. The first left shifter is coupled to the index generator to shift left the index by a number of places corresponding to the PTE size. The second left shifter shifts left the virtual region number by a number places corresponding to a word size of, or a number of bits in, the virtual page number. The logic circuit is coupled to the left and right shifters to perform an OR operation on the left shifted index, the page table offset, and the left shifted virtual region number to provide the PTE virtual address.

The following observations can be made:

1) If the VRN is excluded from the Index computation shown in equation (1a) and if (VRN{N-1:0} << M) and ((PTA.base{M-1:0} OR (Index << PTE size) do not overlap, the linear page table image can be re-mapped from one region to another, without requiring any modifications to the page table memory image.

2) If the region identifier is excluded from the PTA virtual address computation, the page table entries can be managed independently of the region IDs.

The region-based linear page tables do not have to be virtually contiguous throughout all regions, but only within each region. This permits each region's page table to be managed independently. Furthermore, the region-based linear page tables are virtually mapped, i.e. they do not have to be physically contiguous within each region. In other words, the page tables themselves can be paged. In processors with larger virtual addressing capabilities, e.g., 64-bit processors, this significantly reduces the amount of physical memory required by the page tables.

In addition, the performance is increased by tagging translations in the TLB with a region identifier (RID), thereby eliminating the need to flush the TLB on process context switches. The region-based linear page tables are easier to use by software because there is no need to store or encode the RID in the page table.

Since the RIDs are not contained in the page tables, address spaces can be temporarily remapped into other regions, without having to flush the TLBs. This allows much faster cross-address space copying, because existing TLB entries can be re-used, and no additional page table manipulations are required by the operating system software to establish temporary mappings.

Figure 3:
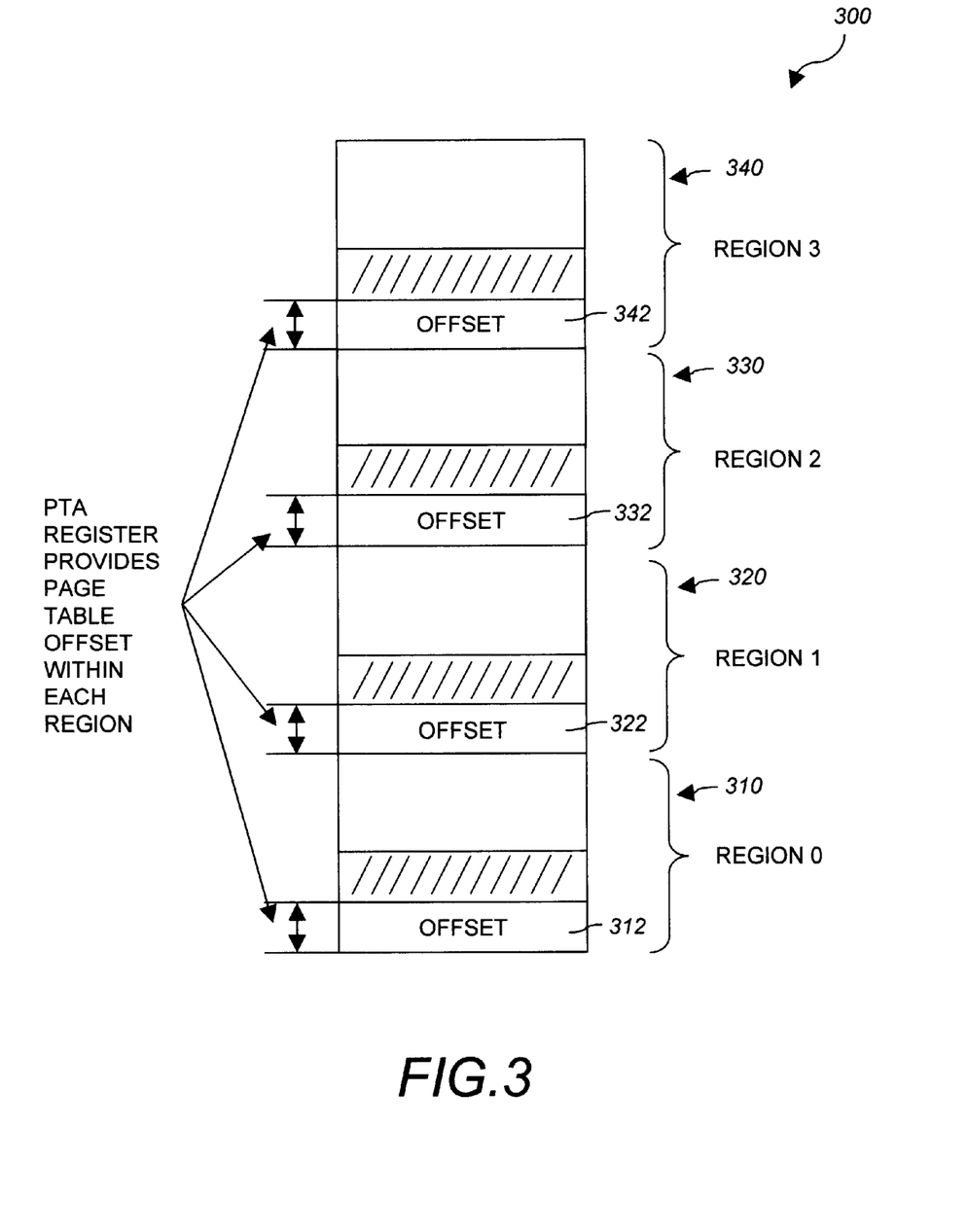
FIG. 3 is a diagram illustrating a region-based page table layout according to one embodiment of the invention.

FIG. 3 is a diagram illustrating a region-based page table layout 300 according to one embodiment of the invention. The page table layout 300 has four regions: region 0 310, region 1 320, region 2 330, and region 3 340. The use of four regions is only for illustrative purposes. Any number of regions can be used.

Since the region-based linear page table is virtually mapped, it is also self-mapping. The offsets 312, 322, 332, and 342 have identical size and are all defined by the PTA register (PTA.base). Having identical offsets has an advantage: an entire region, including its self-mapping part, can be re-mapped to another region simply by transferring its region identifier to another region register.

Figure 4:
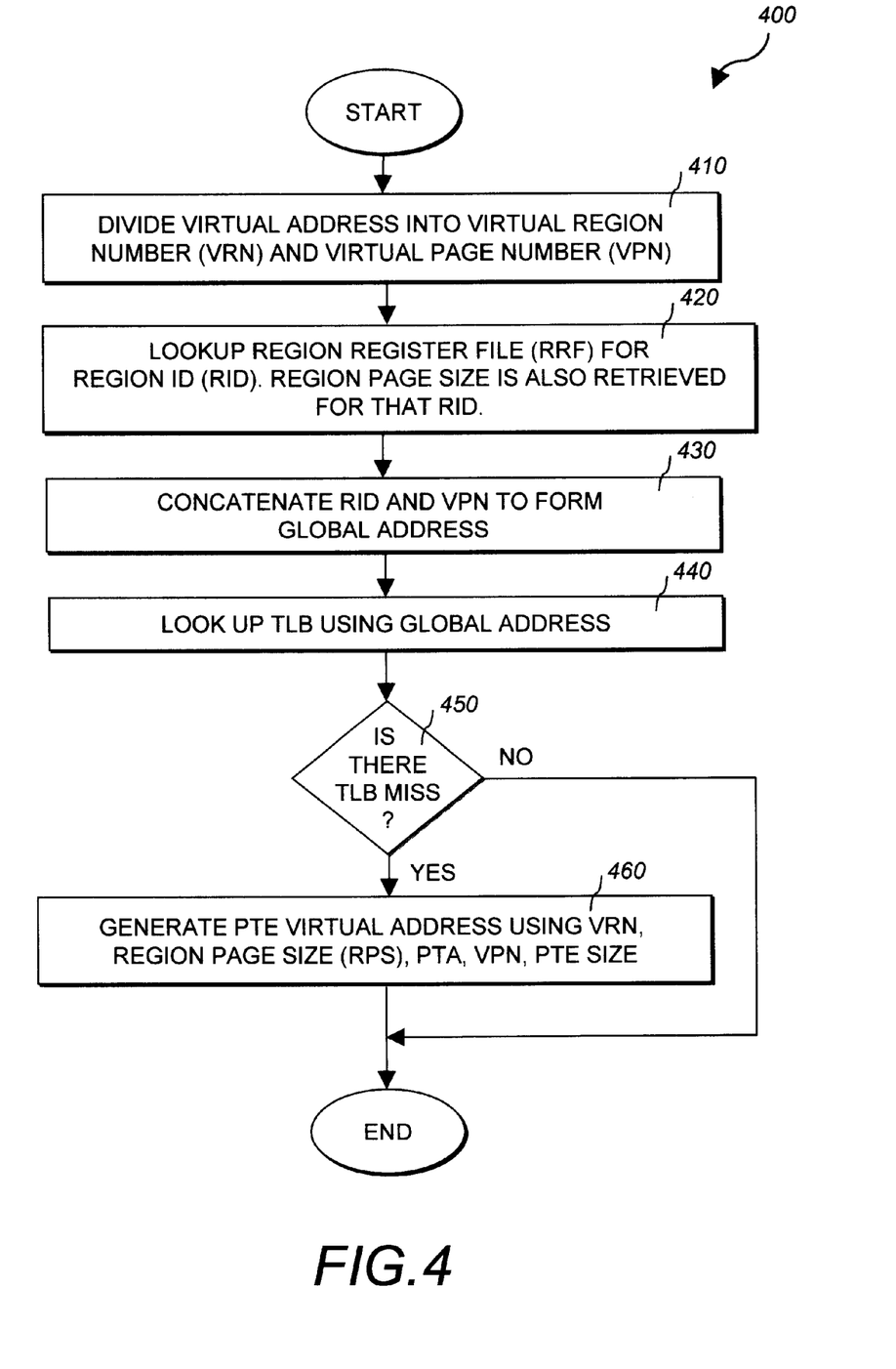
FIG. 4 is a flowchart illustrating a process to perform region-based virtual memory mapping according to one embodiment of the invention.

FIG. 4 is a flowchart illustrating a process 400 to perform region-based virtual memory mapping according to one embodiment of the invention.

Upon START, the process 400 receives the virtual address issued by the processor and divides the virtual address into a virtual region number (VRN) and a virtual page number (VPN) (Block 410). The VRN is used to look up the region register file (RRF) to retrieve the region identifier (RID) (Block 420). The region page size corresponding to the RID is also retrieved.

Then the process 400 concatenates the RID and the VPN to form a global address (Block 430). The global address is then used to look up a translation lookaside buffer (TLB) for a page table entry (PTE) (Block 440). The process 400 determines if there is a TLB miss (Block 450). If there is no TLB miss, the process 400 is terminated. If there is a TLB miss, the process 400 generates the PTE virtual address using the VRN, the region page size, the page table address (PTA) offset from the PTA register, the VPN, and the PTE size as in equations (1a) and (1b) as shown in Block 460. The process 400 is then terminated.

The region-based virtual mapping can also provide performance improvement for cross address space copying. This is due to the following reasons:

First, unlike the traditional cross address space copying techniques, the OS using the region-based virtual memory mapping is not required to change any page table entries. The OS is not required to create temporary page table entries for a temporary address mapping either. The OS temporarily assigns pre-existing source or destination RIDs to two different region registers in the RRF. The definition of the PTE virtual address shown in equations (1a) and (1b) ensures that the page table contents remain valid regardless of which region an address space is mapped to. This is important in cases where the TLB does not contain all mappings required for the copy operation to complete. In this case, the hardware page walker implemented by the virtual linear page table look-up circuit 250 shown in FIG. 2 will be able to find the required PTE.

Second, the TLB lookups are matched based on the unique global address formed by the RID and the VPN, which excludes the VRN bits. As a result, the TLB look-up does not depend on which region an address space is mapped to. The TLB entries are tagged with RIDs, and remain valid as long as the RID for an address space is not re-cycled. As a result of lower OS overhead (i.e., there is no need to create temporary page tables and mappings), and RID-tagged TLB entries leading to fewer TLB misses, cross address space copying can be achieved in less time than using conventional TLBs and OS methods.

Figure 5:
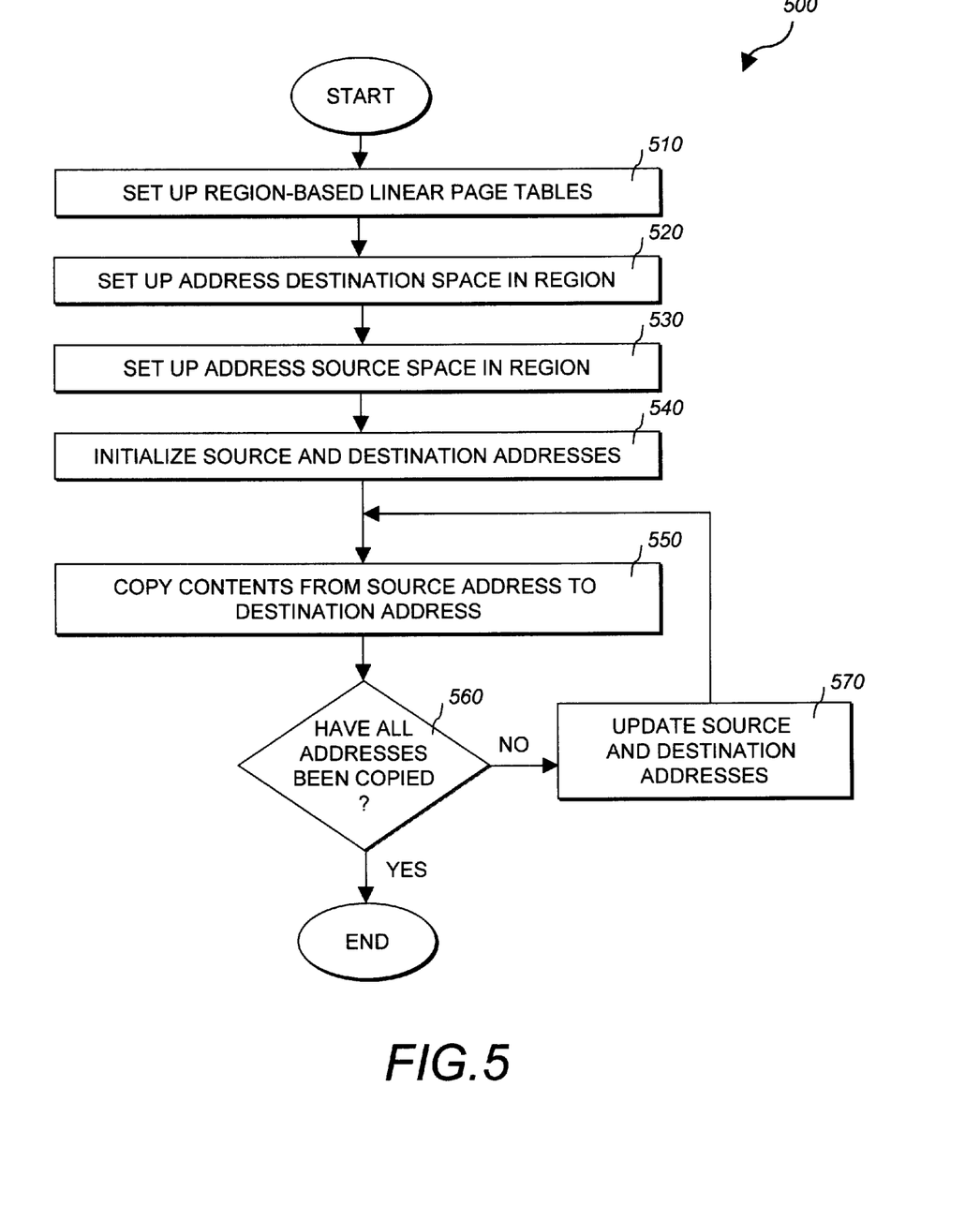
FIG. 5 is a flowchart illustrating a process to perform cross-address space copy according to one embodiment of the invention.

FIG. 5 is a flowchart illustrating a process 500 to perform cross-address space copy according to one embodiment of the invention.

Upon START, the process 500 sets up the region-based linear page tables (Block 510). In other words, the memory management unit is configured or programmed to operate in the region-based linear page tables. Then the process 500 sets up the address destination space in region 0 by assigning one region identifier (e.g., RID 1) into one region register in the region register file (RRF) (Block 520). The process 500 sets up the address source space in region 1 by assigning another region identifier (e.g., RID2) into another region register in the RRF (Block 530).

Next, the process 500 initializes the source and destination addresses (Block 540). These are the virtual starting addresses of the source and destination memory blocks. Then the process copies the contents of memory at the source address to the memory at the destination address (Block 550). The process 500 next determines if all addresses have been copied (Block 560). If not, the process 500 updates the source and destination addresses (Block 570) and then goes back to block 550. If all addresses have been copied, the process 500 is terminated.

Thus, the present invention is a technique to map virtual memory. The technique uses region-based page tables implemented by a region register file and a virtual linear page table look-up circuit. The technique provides more flexibility in memory management and efficient operation, especially for cross address space copying operations.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   providing a region identifier for a virtual address in a virtual memory space, the region identifier identifying a region mapped to by the virtual address, the virtual address including a virtual region number and a virtual page number; and
   generating a page table entry (PTE) virtual address from virtual address parameters using an index obtained from the virtual page number, the virtual address parameters including the virtual address and a region page size used in providing the index.

2. The method of claim 1 wherein the PTE virtual address is virtually mapped.

3. The method of claim 2 wherein the PTE virtual address includes the virtual region number.

4. The method of claim 3 wherein the PTE virtual address is independent of the region identifier.

5. The method of claim 4 wherein the virtual address parameters further include a page table offset provided by a page table address register, and a PTE size.

6. The method of claim 5 wherein generating the PTE virtual address comprises:
   generating the index by shifting right the virtual page number by a number of places corresponding to the region page size;
   shifting left the index by a number of places corresponding to the PTE size;
   shifting left the virtual region number by a number places corresponding to a number of bits in the virtual page number; and
   performing an OR operation on the left shifted index, the page table offset, and the left shifted virtual region number to provide the PTE virtual address.

7. The method of claim 1 further comprising:
generating a PTE from a translation lookaside buffer (TLB) using a global address formed by the region identifier and the virtual page number.

8. The method of claim 7 wherein the PTE virtual address is generated when there is a TLB miss.

9. The method of claim 7 further comprising:
recursively generating the PTE virtual address;
performing a reference to access a PTE in memory; and
inserting the referenced PTE in the TLB.

10. The method of claim 9 wherein control is transferred to software if a mapping of the PTE virtual address results in a TLB miss.

11. An apparatus comprising:
a region register file to provide a region identifier for a virtual address using a virtual region number, the region identifier identifying a region mapped to by the virtual address, the virtual address including the virtual region number and a virtual page number; and
a virtual page table look-up circuit coupled to the region register file to generate a page table entry (PTE) virtual address from virtual address parameters using an index obtained from the virtual page number, the virtual address parameters including the virtual address and a region page size used in providing the index.

12. The apparatus of claim 11 wherein the PTE virtual address is virtually mapped.

13. The apparatus of claim 12 wherein the PTE virtual address includes the virtual region number.

14. The apparatus of claim 13 wherein the PTE virtual address is independent of the region identifier.

15. The apparatus of claim 14 wherein the virtual address parameters further include a page table offset provided by a page table address register, and a PTE size.

16. The apparatus of claim 15 wherein the virtual page table look-up circuit comprises:
an index generator to generate the index by shifting right the virtual page number by a number of places corresponding to the region page size;
a first shifter coupled to the index generator to shift left the index by a number of places corresponding to the PTE size;
a second shifter to shift left the virtual region number by a number places corresponding to a number of bits in the virtual page number; and
a logic circuit coupled to the first and second shifters to perform an OR operation on the left shifted index, the page table offset, and the left shifted virtual region number to provide the PTE virtual address.

17. The apparatus of claim 11 further comprising:
a translation lookaside buffer (TLB) coupled to the region register file to generate a PTE using a global address formed by the region identifier and the virtual page number.

18. The apparatus of claim 17 wherein the PTE virtual address is generated when there is a TLB miss.

19. The apparatus of claim 17 wherein the virtual page table look-up circuit recursively generates the PTE virtual address, performs a reference to access a PTE in memory, and inserts the referenced PTE in the TLB.

20. The apparatus of claim 19 wherein control is transferred to software if a mapping of the PTE virtual address results in a TLB miss.

21. A system comprising:
a processor having access to a physical memory space; and
a virtual address mapper coupled to the processor to map virtual memory space into the physical memory space, the virtual address mapper comprising:
a region register file to provide a region identifier for a virtual address in the virtual memory space using a virtual region number, the region identifier identifying a region mapped to by the virtual address, the virtual address including the virtual region number and a virtual page number, and
a virtual page table look-up circuit coupled to the region register file to generate a page table entry (PTE) virtual address from virtual address parameters using an index obtained from the virtual page number, the virtual address parameters including the virtual address and a region page size used in providing the index.

22. The system of claim 21 wherein the PTE virtual address is virtually mapped.

23. The system of claim 22 wherein the PTE virtual address includes the virtual region number.

24. The system of claim 23 wherein the PTE virtual address is independent of the region identifier.

25. The system of claim 24 wherein the virtual address parameters further include a page table offset provided by a page table address register, and a PTE size.

26. The system of claim 23 wherein the virtual page table look up circuit comprises:
an index generator to generate the index by shifting right the virtual page number by a number of places corresponding to the region page size;
a first shifter coupled to the index generator to shift left the index by a number of places corresponding to the PTE size;
a second shifter to shift left the virtual region number by a number places corresponding to a number of bits in the virtual page number; and
a logic circuit coupled to the first and second shifters to perform an OR operation on the left shifted index, the page table offset, and the left shifted virtual region number to provide the PTE virtual address.

27. The system of claim 21 further comprising:
a translation lookaside buffer (TLB) coupled to the region register file to generate a PTE using a global address formed by the region identifier and the virtual page number.

28. The system of claim 27 wherein the PTE virtual address is generated when there is a TLB miss.

29. The system of claim 27 wherein the virtual page table look-up circuit recursively generates the PTE virtual address, performs a reference to access a PTE in memory, and inserts the referenced PTE in the TLB.

30. The system of claim 29 wherein control is transferred to software if a mapping of the PTE virtual address results in a TLB miss.

31. A computer program product comprising:
a computer usable medium having computer program code embodied therein to map virtual memory space, the computer program product having:
computer readable program code for providing a region identifier for a virtual address in the virtual memory space using a virtual region number, the region identifier identifying a region mapped to by the virtual address, the virtual address including the virtual region number and a virtual page number; and computer readable program code for generating a page table entry (PTE) virtual address from virtual address parameters using an index obtained from the virtual page number, the virtual address parameters including the virtual address and a region page size used in providing the index.

32. The computer program product of claim 31 wherein the PTE virtual address is virtually mapped.

33. The computer program product of claim 32 wherein the PTE virtual address includes the virtual region number.

34. The computer program product of claim 33 wherein the PTE virtual address is independent of the region identifier.

35. The computer program product of claim 34 wherein the virtual address parameters further include a page table offset provided by a page table address register, and a PTE size.

36. The computer program product of claim 35 wherein the computer readable program code for generating the PTE virtual address comprises:

computer readable program code for generating the index by shifting right the virtual page number by a number of places corresponding to the region page size;

computer readable program code for shifting left the index by a number of places corresponding to the PTE size;

computer readable program code for shifting left the virtual region number by a number places corresponding to a number of bits in the virtual page number; and computer readable program code for performing an OR operation on the left shifted index, the page table offset, and the left shifted virtual region number to provide the PTE virtual address.

37. The computer program product of claim 31 further comprising:

computer readable program code for generating a PTE from a translation lookaside buffer (TLB) using a global address formed by the region identifier and the virtual page number.

38. The computer program product of claim 37 wherein the PTE virtual address is generated when there is a TLB miss.

39. The computer program product of claim 37 further comprising:

computer readable program code for recursively generating the PTE virtual address;

computer readable program code for performing a reference to access a PTE in memory; and computer readable program code for inserting the referenced PTE in the TLB.

40. The computer program product of claim 31 wherein control is transferred to software if a mapping of the PTE virtual address results in a TLB miss.

* * * * *